United States Patent Office 3,051,835
Patented Aug. 28, 1962

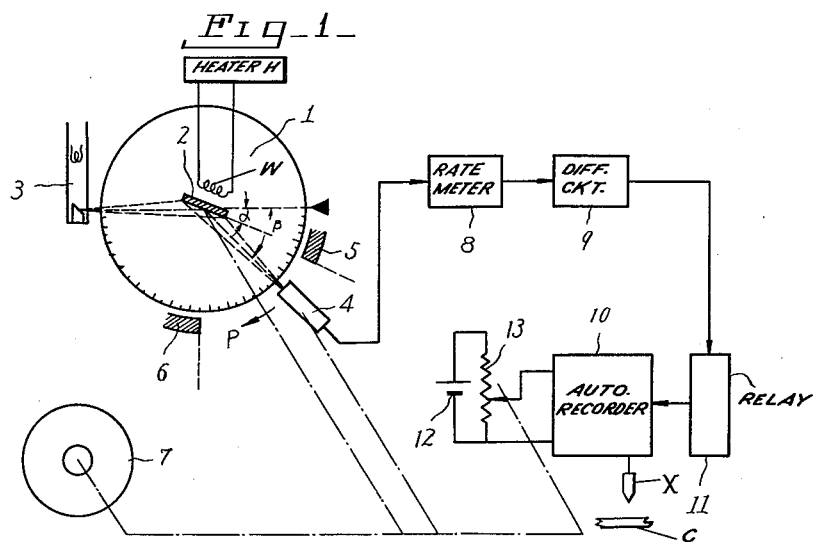
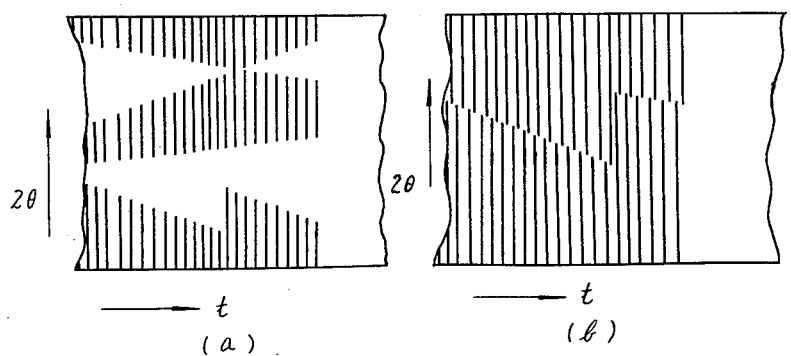

3,051,835
X-RAY DIFFRACTION SYSTEM
Yoshihiro Shimula and Hiroshi Uchida, Tokyo, Japan, assignors to Rigaku Denki Company Limited, Tokyo, Japan
Filed Dec. 22, 1959, Ser. No. 861,378
Claims priority, application Japan Dec. 22, 1958
3 Claims. (Cl. 250—51.5)

This invention relates to a system for measuring the lattice spacing of crystal by means of X-rays.

The lattice spacing of a crystal can be determined by measuring the diffraction angle of X-rays of a certain wavelength radiating the surface of the crystal. For measuring, for example, the process of changes in lattice spacing caused by temperature variation on the basis of the above principle, it has been the practice in the prior art to measure a diffraction angle at a given temperature first and repeat this measurement after the temperature of the crystal is changed. From the data thus obtained, it is possible to obtain information on the variation of internal structure or variation of crystal lattice caused by the temperature change of the material by drawing a graph showing the relation between lattice spacing and temperature.

This method has disadvantage in that the measurement procedure is not only very troublesome and requires a great deal of time, but also any discontinuous changes in lattice spacing which might possibly take place in the transition process between a certain temperature and an adjacent different temperature can not be detected. Furthermore, small changes in such lattice spacings cannot be detected.

It is an object of the present invention to provide a system for measuring the change of lattice spacing effected by thermal change of a crystal. In the system of the present invention a goniometer is rotated through the desired angle. The value of the rotation angle of the goniometer is applied to an automatic recorder to control the position of a recording pen, and the feeding speed of recording paper is maintained at a constant rate while the temperature of the crystal to be measured is changed at a constant rate for correlating the longitudinal length of the paper to the size of the crystal. The recording pen is controlled by the output of a Geiger counter which depends on the intensity of the diffracted beam of X-ray on the crystal.

It is a further object of this invention to provide a system as disclosed above in which the foregoing defects of the prior art are entirely removed.

It is a still further object of this invention to provide an apparatus for precisely investigating a sudden change in lattice spacing.

Other objects and advantages of the invention will be apparent from the following description.

In order that the invention may be readily understood and carried into effect, the invention is hereinafter described by way of example and with reference to the accompanying drawings, in which;

FIG. 1 is a schematic diagram showing an arrangement of the present invention; and FIG. 2 is an example of a recorded pattern obtained by a system according to the invention.

Referring to FIG. 1, a unit of the present invention includes a goniometer 1, specimen 2 is mounted in the center thereof, an X-ray tube 3 positioned at the periphery of the goniometer, and a counter tube 4. The goniometer 1 is rotated by means of a motor 7 that the counter tube 4 makes reciprocating movements at a given speed between stoppers 5 and 6 as indicated by an arrow P. At the same time the specimen is rotated by a suitable means in such a manner that the rotation angles $\alpha$ and $\beta$ between the specimen surface and the travelling position of counter tube 4 are maintained in the relation of one to two and the focus of X-ray tube 3, the surface of the crystal 2 and the receiving window of the counter tube 4 are kept in relative position adapted to meet the Bragg-Brentano equation.

A beam of a given wavelength from the X-ray tube 3 is emitted onto the surface of the specimen 2 and the diffracted beam from the specimen 2 is received by the counter tube 4. The output of the counter 4 which corresponds to the intensity of the diffracted beam is applied to a rate meter 8, the output of which in turn is applied to a differential circuit 9. The output of the differential circuit 9 is applied to a relay 11 in an automatic recorder 10 in order to position a pen X of the recorder on or off the surface of chart paper C which is moved at a constant speed. The pen X of the recorder 10 is reciprocated by driving a potentiometer which consists of an electric source 12 and a rheostat 13 by means of the motor 7 synchronously with the rotation angle of the goniometer 1 while the speed of movement of the chart paper C is kept constant. The specimen 2 is heated by a conventional heating means H including, for example, a wire W which is heated by the passage of an electric current therethrough, the temperature in the specimen being elevated or reduced at a constant rate.

The value of the angle of incident X-ray on the specimen is varied in accordance with the rotation of the goniometer 1 and the output of the counter 4 is rapidly increased when the value of the diffraction angle of the X-ray corresponds to the lattice spacing in the specimen while the output of the counter 4 is rapidly reduced when the value of the diffraction angle passes through the corresponding interval of the lattice spacing. Since the output of the counter 4 is differentiated by the differential circuit 9, the relay circuit 11 is actuated when the output of the counter 4 is suddenly reduced as mentioned above, and the pen of the recorder 10 is thus selectively contacted with or removed from the paper. Accordingly, if the selection of the operation is carried out such that the pen performs the above operation when the goniometer 1 is only rotated in the direction of the arrow P and is not in contact with the paper when the goniometer is rotated in the opposite direction, and if the feeding speed of the paper with respect to the cycle of the reciprocation of the goniometer is reduced considerably, and if the pen is positioned at regular intervals, straight lines will be traced on the paper and the lines will be interrupted each time the output of the counter 4 is rapidly changed.

If the goniometer 1 is rotated through the minimum rotation angle $\beta$ and the pen is contacting the paper, a straight line appears on the paper in accordance with the increase of the angle $\beta$. When the intensity of the diffracted X-ray beam is rapidly increased and rapidly decreased, the pen is removed from the surface of the paper, and the straight line is broken. If the intensity of the diffracted X-ray beam remains constant, the pen will remain in contact with the paper and then a straight line will be traced on the paper. A number of separate parallel lines will be traced on the paper in such manner. However, when the lattice spacing of the specimen is varied in accordance with the thermal change of the specimen, the increasing angle $\beta$ of the diffracted X-ray beam will be changed in response to the variation of the lattice spacing and the intermittent portion of the straight line to be recorded on the paper will be dependent on it, and therefore, for example, the pattern shown in FIG. 2(a) is obtained.

Since the initial point or terminal point of each straight line denotes the angle where diffraction takes place and the longitudinal direction along the paper shows the temperature $t$ in the specimen, if the chart paper is indexed with the diffraction angle $2\theta$, the line connecting the beginning and terminal end of each of straight lines shows the changing state of the lattice spacing with respect to the thermal change of the specimen.

In the foregoing it is considered that the measurement for the spacing of the lattice is the case where the goniometer is rotated in a constant direction, but a measurement will be effected even though the goniometer is rotated in any direction. FIG. 2(b) is an example of the pattern showing the thermal change of the lattice spacing in this case.

What we claim is:

1. Apparatus for recording the change of lattice spacing of a crystal as a function of the thermal change of said crystal, said apparatus comprising a goniometer continuously rotatable clockwise and counterclockwise between predetermined limits, an X-ray source disposed to irradiate said crystal with an X-ray beam, said X-ray beam being irregularly diffracted from said crystal, means to vary the temperature of said crystal, and recording means responsive to the diffracted X-ray beam and the rotation of said goniometer to record continuously the change of lattice spacing as a function of the temperature change of said crystal; said recording means including a recording medium advanceable at a constant rate, and a recording device adapted to contact said recording medium selectively in accordance with irregularities in the diffracted beam.

2. Apparatus as claimed in claim 1, wherein said goniometer includes a reciprocable counter to measure the diffracted X-ray beam, said counter having a determinable output, and means operatively associated with said counter and including a circuit for differentiating said output from the counter to indicate variations in said output.

3. Apparatus as claimed in claim 2, wherein said crystal is centrally located within the goniometer, said crystal being rotatable independently of said goniometer, said goniometer and X-ray source being positionally related to the crystal such that the angle formed between said diffracted X-ray beam and said counter is twice the angle formed between the X-ray beam irradiating the crystal and said crystal.

References Cited in the file of this patent

UNITED STATES PATENTS

| | | |
|---|---|---|
| 2,386,785 | Friedman | Oct. 16, 1945 |
| 2,619,600 | Hamacher | Nov. 25, 1952 |
| 2,819,405 | Bond | Jan. 7, 1958 |

OTHER REFERENCES

Birks et al.: A High Temperature X-Ray Diffraction Apparatus, article in The Review of Scientific Instruments, vol. 18, No. 8, August 1947.